United States Patent
Patel et al.

(10) Patent No.: US 7,085,052 B2
(45) Date of Patent: Aug. 1, 2006

(54) OVER-PARAMETERIZED POLARIZATION CONTROLLER

(75) Inventors: Jayantilal S. Patel, Newtown, PA (US); Zhizhong Zhuang, Bensalem, PA (US)

(73) Assignee: Optellios, Inc., Ewing, NJ (US)

( * ) Notice: Subject to any disclaimer, the term of this patent is extended or adjusted under 35 U.S.C. 154(b) by 50 days.

(21) Appl. No.: 10/387,247

(22) Filed: Mar. 12, 2003

(65) Prior Publication Data

US 2003/0174400 A1 Sep. 18, 2003

Related U.S. Application Data

(60) Provisional application No. 60/370,830, filed on Apr. 8, 2002, provisional application No. 60/364,854, filed on Mar. 14, 2002.

(51) Int. Cl.
G02B 27/28 (2006.01)
G02B 5/30 (2006.01)

(52) U.S. Cl. .................. 359/497; 359/501; 359/249; 359/256

(58) Field of Classification Search ............ 359/249, 359/256, 251, 252, 254–255, 497–499, 494, 359/501
See application file for complete search history.

(56) References Cited

U.S. PATENT DOCUMENTS

| | | | |
|---|---|---|---|
| 4,958,918 A * | 9/1990 | Walker ...................... | 359/249 |
| 4,979,235 A | 12/1990 | Rumbaugh et al. | |
| 5,005,952 A | 4/1991 | Clark et al. | |
| 6,384,956 B1 * | 5/2002 | Shieh ........................ | 359/256 |
| 2003/0151789 A1 * | 8/2003 | Hamoir ..................... | 359/239 |

FOREIGN PATENT DOCUMENTS

JP 410197840 A * 7/1998

OTHER PUBLICATIONS

T. Chiba, et al., "Polarization Stabilizer Using Liquid Crystal Rotatable Waveplates", *Journal of Lightwave Technology*, vol. 17, No. 5, pp. 885-890, May 1999.
S. Rumbaugh, et al., "Polarization Control for Coherent Fiber-Optic Systems Using Nematic Liquid Crystals", *Journal of Lightwave Technology*, vol. 8, No. 3, pp. 459-465, Mar. 1990.

(Continued)

*Primary Examiner*—Leonidas Boutsikaris
(74) *Attorney, Agent, or Firm*—Duane Morris LLP

(57) ABSTRACT

A controller, particularly for setting a desired or randomized polarization state of an output light beam derived from an input, has more than the minimum number of controllable optical elements needed to determine the state of the output. The controller applies control input values to obtain a desired output state. The controller also selects among plural alternative sets of control values that could obtain the desired output state, so as to minimize other error conditions. The concurrent error conditions can be associated finite control range limits, for example to keep the input values near a middle of their ranges. Additional error conditions can include minimizing the incremental change in the values from one set to the next. The control is particularly useful to avoid problems associated with using finite range control elements such as liquid crystals for differential retardation or orthogonal light components, when controlling an endless or periodic parameter such as polarization. In the preferred arrangement, six retardation cells are used to control two independent variables determining polarization state.

24 Claims, 6 Drawing Sheets

OTHER PUBLICATIONS

N. Walker, et al., "Polarization Control for Coherent Communications", *Journal of Lightwave Technology*, vol. 8, No. 3, pp. 438-458, Mar. 1990.

R. Noé, et al., "Endless Polarization Control Systems for Coherent Optics", *Journal of Lightwave Technology*, vol. 6, No. 7, pp. 1199-1208, Jul. 1988.

F. Heismann, et al., "Broadband Reset-Free Automatic Polarisation Controller", *Electronics Letters*, vol. 27, No. 4, pp. 377-378, Feb. 1991.

R. Noé, et al., "Endless Polarisation Controller Using Electro-Optic Waveplates", *Electronics Letters*, vol. 24, No. 7, pp. 412-413, Mar. 1988.

F. Heismann, "Analysis of a Reset-Free Polarization Controller for Fast Automatic Polarization Stabilization in Fiber-optic Transmission Systems", *Journal of Lightwave Technology*, vol. 12, No. 4, pp. 690-699, Apr. 1994.

* cited by examiner

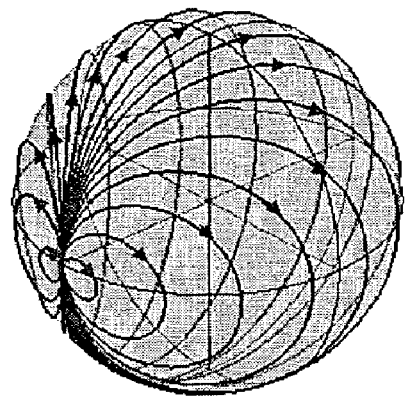
Fig. 5
Fig. 6(a)
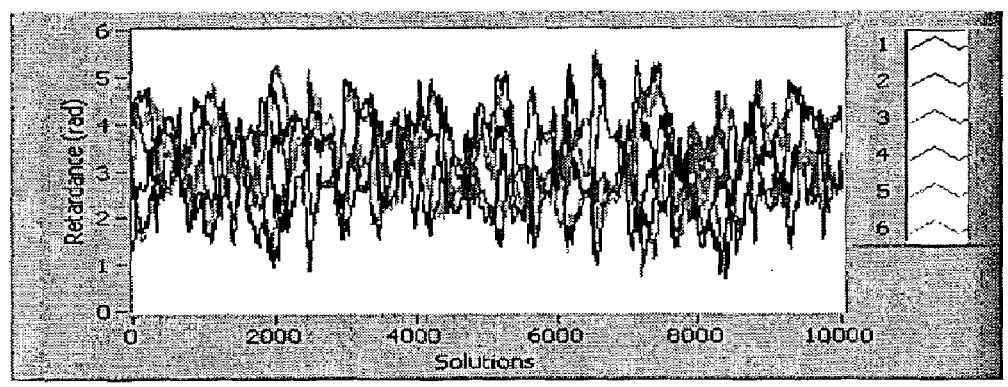
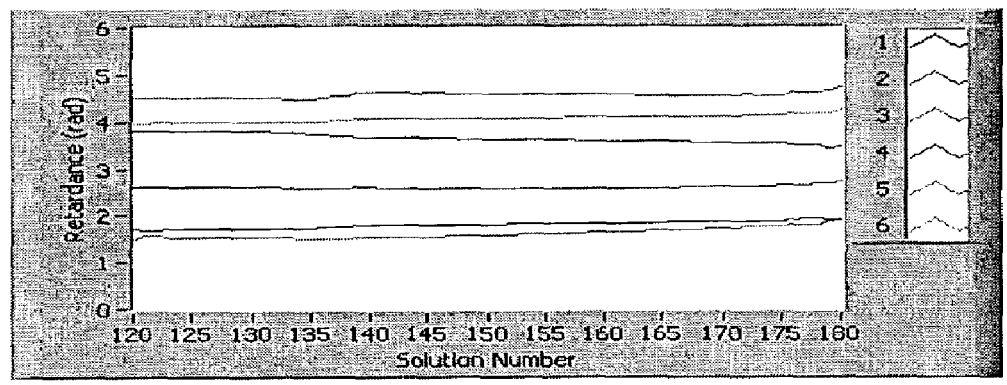
Fig. 6(b)

OVER-PARAMETERIZED POLARIZATION CONTROLLER

CROSS-REFERENCE TO RELATED APPLICATIONS

This application claims the priority of U.S. Provisional Patent Applications Ser. No. 60/364,854, filed Mar. 14, 2002 and Ser. No. 60/370,830, filed Apr. 8, 2002.

BACKGROUND OF THE INVENTION

1. Field of the Invention

The invention relates to the field of control devices, especially a polarization state control device for optical communication systems and other uses, wherein two or more parameter controls are cascaded, each variably contributing to the value of an output, and each control having only a finite span of control range. The invention provides a technique for coordinating the extent of displacement of the output value that is contributed by the respective parameter controls. The technique is useful for an endless polarization state controller (the polarization state being a set of periodic attributes), and is also applied in this disclosure to a polarization scrambler and a polarization synthesizer.

2. Prior Art

It may be desirable in various contexts to have two or more independently controlled parameters contribute to determining the value of an output. In a positioning control, for example, two controllers each having a span of zero to "X" might be cascaded, i.e., one carried on the other, to achieve a summed span of zero to 2X. At the limit of the span (near 2X), it is necessary to have each cascaded parameter set near its full 1X span. At output values that are less than the full span, more or less of the output can be contributed by one or the other of the cascaded controls, provided that the sum is equal to the desired output. Thus, for example, an output value of 1X could be achieved by any arbitrary combination adding up to the desired 1.0 value (e.g., 1.0+0.0 or 0.5+0.5 or 0.62+0.38, etc.).

Polarization controllers are akin to positioning controls because the polarization state of a propagating electromagnetic wave such as a light beam or light wave is due in part to the presence and/or relative amplitude of mutually orthogonal components of the electric field, and also is due in part to the relative phase positions of these components. Inserting a delay or retardation of one component relative to the other, thereby effectively repositioning the components relative to one another, amounts to a change in the polarization state of the light wave.

The periodicity of the light wave is another factor to consider. Assuming that one of the mutually orthogonal components at a particular wavelength is delayed relative to the other by an integer multiple of $2\pi$ radians or 360°, the same polarization state is achieved as if there was a no delay or a delay of some other integer multiple.

It may be desirable to provide a polarization control with an output span that is greater than $2\pi$ radians at a given wavelength, for example simply to achieve a zero to $2\pi$ span at some longer wavelength or to mimic the endless rotation of a waveplate. In a differential sort of control, it may be desirable to provide a controller that is always capable of adding to the retardation of one of the components, regardless of the previous value of the retardation at which the control was set. That capability effectively requires a control span from zero to infinity.

Relative retardation of mutually orthogonal components can be controlled using controllable birefringence such as electrically controlled liquid crystals. By definition, birefringence involves a difference in the retardation experienced by mutually orthogonal components of a light signal. Controlling the birefringence determines the difference in the respective retardations and thus the relative phase delay. With a suitable arrangement of at least two plates oriented at 45° relative to one another (so as to ensure controllable retardation of each component of an arbitrary input), the polarization state of a light signal can be adjusted.

It may be possible to provide a birefringent element, such as a liquid crystal, that is thick enough to provide the desired span of relative retardation control (e.g., zero to 360° or some other span). For practical reasons, it may be preferable to have plural cascaded birefringent elements that contribute additively to the retardation. As an example, the response time of two thin elements that additively achieve a given retardation is likely to be less than the response time of a single thick element that is capable of the same retardation.

Polarization controllers using tunable birefringent waveplates are known. Typical configurations use three cells (see, e.g., U.S. Pat. No. 4,979,235) or four cells (U.S. Pat. No. 5,005,952). These configurations may suffer from problems that arise because limited tuning range devices, namely individual cascaded controls, are being used to control an unlimited periodically repeating parameter, namely polarization evolution. Assuming that a control value is incrementally increased, for example, continued operations may call for an unlimited or infinite span of control, even though the phase delay repeats at increments of $2\pi$ radians. This conflict can be termed the "endless control" problem. The required parameter variations that may be required continue endlessly, but the individual cascaded elements have only a finite span of which they are capable of differentially retarding components of the light signal. As a consequence, the present control values applied to the individual elements may need to be brought back from their limits, resetting operations at a new starting point, when a limit is reached for one or more control spans. The limit has made further increase in that control value impossible.

If one differentially adds an increment of retardation in repetitive control steps to one or another of the controlled cascaded elements, one will eventually reach the end of the span of that controlled element. It is then necessary to interrupt the control procedure (i.e., to stop simply adding increments to the now-maxed controlled element) and to achieve the desired output in a different way.

There are methods that can deal with this problem, but they often involve complicated structures and synchronized mechanical and electrical controls. Complication and expense are normally to be avoided in a practical application. One method is to choose a sort of control that inherently has an unlimited tuning range, such as one comprising rotating waveplates. The rotational position of a waveplate can provide a form of unlimited free space optical orientation that is unlimited, unlike a fixed-span adjustable device such as a birefringent element with a finite span of controllable birefringence. Nothing prevents indefinitely continued rotation of a rotatable waveplate, in one direction or the other. A mechanical polarization rotator is available from OZ Optics, Ltd., Ottawa, ON. An electrical polarization rotator with specially designed electrodes is described by T. Chiba, Y. Ohtera, and S. Kawakami, Journal of Lightwave Technology, Vol. 17, No. 5, p885, 1999. These solutions are less than optimal. The mechanical rotation technique is susceptible to fatigue and it is bulky. The electrical rotation technique relies on precise alignment and high control voltages.

An alternative method for dealing with the endless problem is to use "unwinding" of one or more cascaded controls of a periodic parameter. Unwinding has the object of bringing the control point back, from a point that is at or uncomfortably close to the end of its control range. In order to obtain the same value at the output, the control point can be returned to a point that differs by a retardation of precisely $2\pi$, typically by varying the level of other contributing controls (e.g., controls that are cascaded with the one being unwound). This must be done in a coordinated manner in order to maintain the desired output level of the contributed or cascaded control parameters while the one is being unwound. Because the output polarization state is insensitive to a $2\pi$ change in retardation, the contributing controls will return to their respective previous values after the "unwinding" process.

An example of this unwinding or resetting process as described can be found in the publication of S. H. Rumbaugh, M. D. Jones, and L. W. Casperson, Journal of Lightwave Technology, Vol. 8, No. 3, p459, 1990. In that paper, an endless polarization control scheme is described using three Liquid Crystal cells. The authors discuss an endless transformation, namely from an arbitrary state of polarization to a fixed linear state of polarization.

The general principle of unwinding was also reported in a paper of N. G. Walker and G. R. Walker, Journal of Lightwave Technology, Vol. 8, No. 3, p438, 1990. The configuration and unwinding mechanism described in this paper require birefringent elements having a retardation tuning range of $4\pi$, or two complete 360° phase delays, in order to achieve unwinding in any situation. In some situations, the unwinding process is complex. It would be advantageous if unwinding could be accomplished without requiring such a large span of controllable retardation, thereby employing relatively thinner, faster and possibly less costly elements.

What is needed is a way to manage the span of cascaded control parameters, so as to deal efficiently with the problem of unwinding a control that has reached an undesired point in its control range.

SUMMARY OF THE INVENTION

It is an object of the invention to introduce a general method for endless polarization control that can eliminate the need for an "unwinding" process for devices with a limited tuning range.

It is also an object to efficiently manage the desired parameter of individual cascaded control variables in over-parameterized control systems, namely systems in which there is at least one redundancy permitting the control point maintained for one of a plurality of cooperatively related variables to be moved at least somewhat, while maintaining a given output value based on the sum (or other cooperative function) obtained by interaction of the control variables.

The invention is described with reference to endless polarization control by the use of interactive control variables (e.g., controlled parameters that sum), wherein the control variables have limited tuning ranges. This situation is characterized by the use of retardation for obtaining a controlled state of polarization ("SOP"). The invention is applicable as well to other systems with both limited and unlimited controls, such as those containing fixed as well as rotating waveplates that interact. In that case, the number of controls required for endless control can be different, but the general principles discussed herein will still apply.

It is a further object to facilitate polarization control in a polarization state scrambler. The general requirement of a polarization scrambler is to vary or scramble the states of polarization (SOP) of an output light beam such that the Degree of Polarization (DOP) is close to zero. This is achieved if the output polarization can assume any arbitrary state (e.g., any point on a Poincaré Sphere), while the output polarization also has an equal probability of having any other possible arbitrary state (the output thus having uniform coverage on the Poincaré Sphere). The over parameterized system as described herein can facilitate endless polarization control, and if used as a polarization scrambler, can yield a more uniform scrambled set of output polarization states that is otherwise possible.

In addition to achieving advantageous characteristics in the output, another object is to improve the apparatus employed, for example to control the cost of the apparatus, e.g., to make it relatively simple, and to use optimal control elements. Thus the invention, for a given control range, uses a relatively larger number of cells of smaller individual cell thickness than characteristic of the prior art. Small cell thickness allows quick response, i.e., fast rise and fall times when changing from one control point to another.

The over parameterized polarization controller of the invention can be used in a cascaded fashion, with polarization sensitive sensor or power monitor in between or following certain cells. In that configuration, the invention can function as a polarization synthesizer for arbitrary input polarization. Alternatively or in addition, the invention is applicable to a feedback control.

A number of additional objects and aspects will be made apparent by the following description of practical examples.

BRIEF DESCRIPTION OF THE DRAWINGS

There are shown in the drawings certain exemplary embodiments and examples; however it should be appreciated these are nonlimiting and that the scope of the invention should be determined with reference to the appended claims. In the drawings, FIGS. 1(*a*) and 1(*b*) illustrate a control device, specifically a polarization state control, having two adjustable parameters, thus being capable of a deterministic trajectory or succession of states leading from an initial control point (1) to a final control point (4).

FIG. 5 is the trajectory of the unbounded rotation of the input SOP used in the simulation.

FIGS. 6(*a*) and 6(*b*) are graphs showing the results of certain trials in which three error minimizing objectives are employed as in FIG. 5.

DETAILED DESCRIPTION OF THE PREFERRED EMBODIMENTS

Figure 1A:
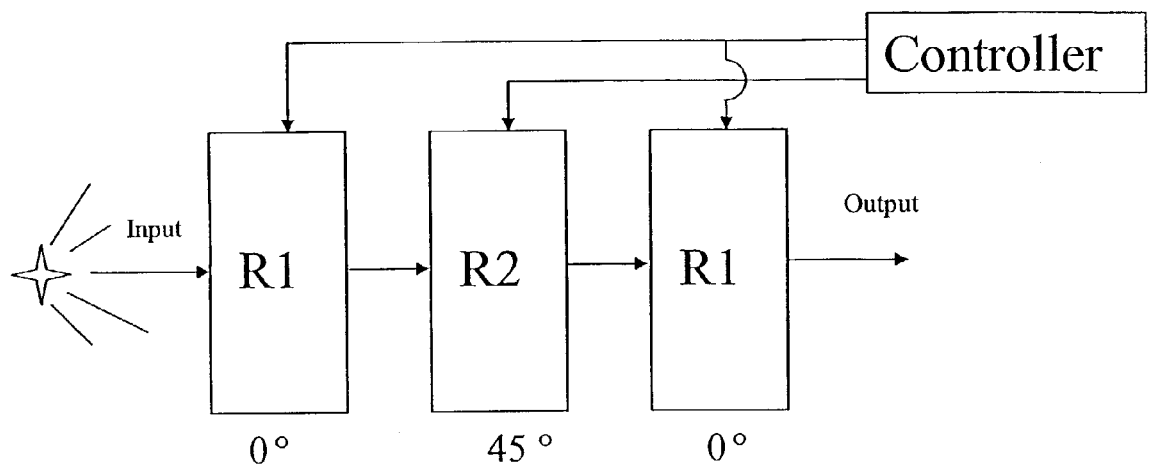

The invention generally concerns the design and operation of control systems having a plurality of controlling input values that cooperatively contribute to an output or controlled value. At least certain of the input values have available only a finite span. The invention controls the cooperative inputs to optimize use of the available span. This is particularly apt for a polarization control device wherein an effectively endlessly periodically variable function, namely polarization state, is to be controlled using differential phase retardation elements that together have a sufficient control span to encompass at least $2\pi$ radians of differential phase retardation.

The concepts of the invention are applicable in a number of contexts wherein the controlling input values affect the output value. The invention is described with reference to a system in which the controlling inputs are differential retardations applied by cascaded optical elements to orthogonal components of a light signal.

According to the invention, the number of controllable parameters used to contribute to control of the output value, are greater than the minimum number of controllable parameters that would be needed for such control of the output value. For example, a known linearly polarized light can be transformed into an arbitrary state of polarization non-endlessly by only two control parameters, and endlessly by three control parameters using the "unwinding" technique. By providing extra or over-parameterized controlling inputs, it is possible to choose which of the control variables will be incremented or decremented in order to achieve a predetermined effect on the output value without the need to use an "unwinding" process. According to an inventive aspect, this choice is controlled using simultaneous error-reduction control schemes.

According to an inventive aspect, achieving a control or transfer function for obtaining a given output value is an important objective of the control, but accuracy of the output value is only one of the objectives. At least one additional objective, and in the preferred embodiment three simultaneous objectives, determine the choice of input values that are used to obtain a given output value.

In connection with a polarization state controller, the invention provides a way to achieve an endlessly controllable variation in the periodic output function of polarization state, namely by exceeding $2\pi$ radians of differential phase retardation. The invention provides endless output control in the sense of differential retardation from zero to infinity. This is accomplished by varying the differential phase retardation inserted by cascaded optical retardation elements that individually have limited spans of retardation control.

Any control system capable of controlling an output value has at least a minimum number of controllable input parameters that affect the output value. The particular controllable parameters used, and the minimum number of control parameters needed, depend upon the nature of the control system. A control system using the minimum number of controllable parameters (inputs) can be operable to set the output value to a desired value. However use of the minimum number of inputs dictates that the output value is set in a fixed and deterministic way for some or all of the potential output values.

A control system using more than the minimum number of controllable parameters (inputs) can likewise be operable to set the output value to a desired value. However, by using more than the minimum number of controllable parameters, there is a choice available as to which of the inputs are to be deflected to achieve the desired output value. According to an inventive aspect, extra inputs of an over-parameterized control system provide freedom to choose among alternative control operations, and thus enable the control scheme to satisfy other concerns in addition to seeking the desired output value. In polarization control, such other concerns preferably include controlling the incremental size of stepwise diversions of individual input values to move from one output value to the next output value (e.g., minimizing and potentially avoiding radical changes in any individual input values), and maintaining each input at a desired control point between endpoints of its control range or span (e.g., seeking a midpoint in a control span, so as to minimize or avoid the occurrence of subsequent changes that might tend to challenge the available span). These concerns can be satisfied in an over-parameterized control, and in particular in an over-parameterized polarization control.

In the over-parameterized control system of the invention, a selective control process governs the selection of input value changes to be employed. The selective control process is arranged to choose among and/or proportionately to invoke two or more alternative input changes that could independently achieve a given effect on the output value. The selective control process determines an optimum set of control parameters using a set of simultaneous error minimizing rules.

A change from one arbitrary output value to another requires control of at least the same number of variable as are used uniquely to characterize the output value. In the preferred application of polarization state control, an arbitrary change from one state of polarization to another, requires a minimum number of control parameters equal to the minimum number of variables operable to uniquely characterize a polarization state, namely two variables. Assuming that the input light is completely polarized light, at least two parameters are needed to define a polarization state, such as ellipticity and the reference orientation angle of the electric field. Therefore, in order to change the output from one arbitrary SOP to another, at least two independent control parameters are needed because there are two independent variables to be controlled.

A polarization controller could therefore use only two control parameters. Typically, polarization controls employ a selected degree of differential retardation to alter a polarization state. Because of the limited tuning range that a controllable retardation element can achieve, the controller may run up against the end of an element's tuning range. As a practical matter, such a controller cannot choose among alternative inputs for reasons that are not immediately related to achieving a given output value. The controller has no freedom to accommodate an endless control range (e.g., several times $2\pi$ radians or more). The controller may need to define its operations within zero to $2\pi$ radians and/or to "unwind" a control or input parameter that approaches the end of its available range.

According to an aspect of the present invention, one or more added degrees of freedom are provided. In other words, the system is over-parameterized in the sense of having optional control inputs for achieving a given output value. At the same time, the control system is arranged usefully to employ the additional degrees of freedom to deal proactively with certain problems such as the endless control problem (which is related to having a limited span of input control level) and with the need to provide a highly responsive control (the rise and fall times being related to the size of differential control steps).

FIG. 1(a) shows an example of a polarization controller using control of the differential retardation of orthogonal components, in order to alter the polarization state of a light wave. This controller has the minimum number of controllable parameters needed to accomplish a change in polarization state. Three cells are shown, but two of the cells R1, R1, are coupled for common control, thus providing two inputs, R1 and R2.

In FIG. 1(a), the three cells are arranged such that the relative orientation is 45° for adjacent cells. The polarization state of the light wave is affected by the differential retardation applied by the individual cells. The first and the last cells as shown are coupled, so as to have the same retardation.

Cells R1—R1 and R2 are oriented at 45° to accommodate a light wave at any arbitrary orientation. Regardless of the orientation, the mutually orthogonal components of any arbitrary light wave will be aligned to each of the two orthogonal axes of at least one of the cells. This ensures that the combination of cells can impart differential retardation in the light wave components, to a controllable extent, thus enabling a change from one unique polarization state to another.

Figure 1B:
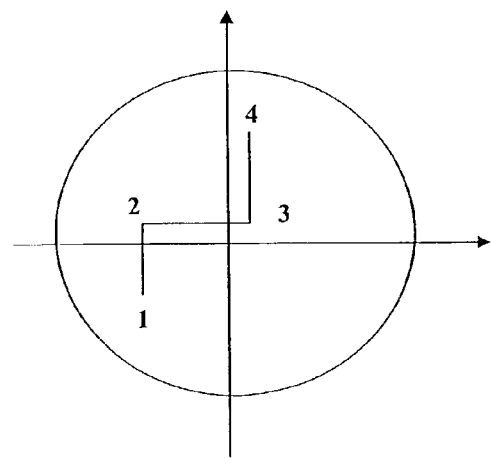

The result of such an arrangement, shown in FIG. 1(b) as the projection of a Poincaré Sphere, is that the control is limited as to the trajectory that can be used to change from a state of polarization at point 1 to the state of polarization at point 4. There is no alternative other than to alter the inputs to R1 and R2, which is schematically shown as an alteration in SOP parallel to the orthogonal coordinate axes.

Figure 2A:
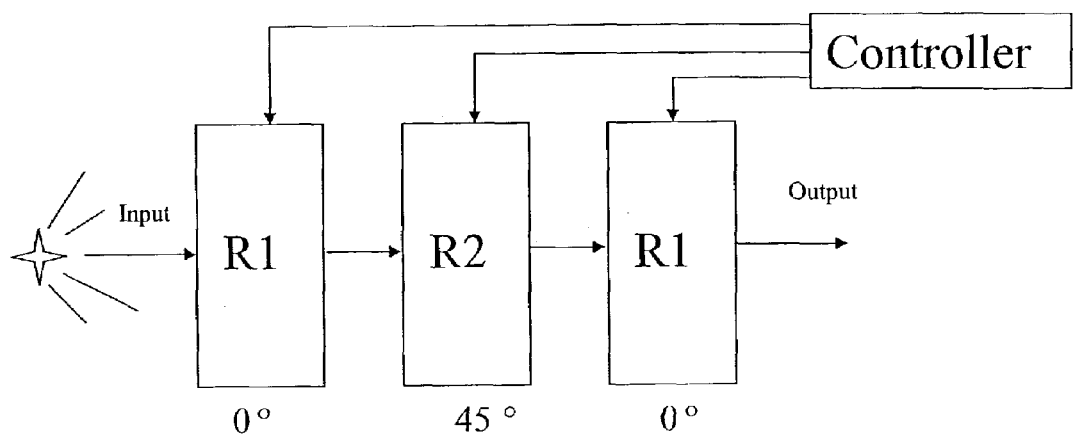
FIGS. 2(*a*) and 2(*b*) illustrate a control device that is comparable to FIGS. 1(*a*) and 1(*b*), but has an added degree of freedom, whereby there are a choice of trajectories for progressing between control points (1) and (4).
Figure 2B:
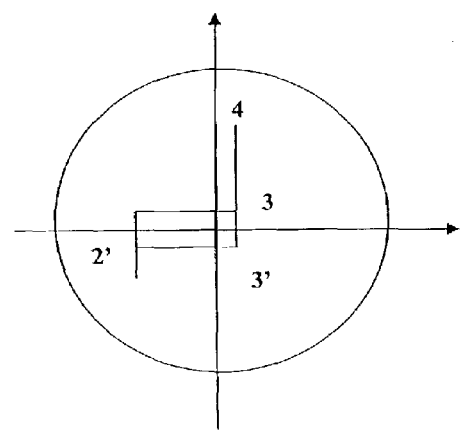

Adding an additional control input, shown in FIGS. 2(a) and 2(b), causes the control to be over-parameterized. In FIG. 2(a), the cells are oriented as in FIG. 1(a), but the first and last cells R1, R3 are now decoupled from one another as well as from the intermediate cell R2 at 45°. With three independently controllable variables, namely the differential retardation imparted by R1, R2 and R3, respectively, a choice is provided as to which of the control inputs will be employed to achieve an arbitrary alteration in the SOP. In fact, there are any number of choices, including gradations in which a given change to the output is contributed more or less by one or another of the three cells.

Figure 3:
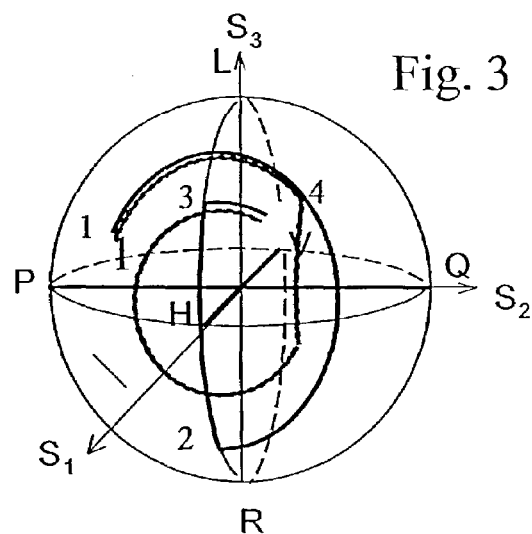
FIG. 3 illustrates the concept of a selection of trajectories using the specific example of a polarization state control, the control points being points on a Poincaré Sphere.

FIG. 2(b) schematically shows that there are different optional trajectories to be selected for altering the SOP from point 1 to point 4. FIG. 3 illustrates the choice of trajectories on a three dimensional depiction of state of polarization (SOP) using a Poincaré Sphere. As is apparent, there are numerous routes over the surface of the Sphere that lead from one SOP to another and thus can be used optionally. This aspect is provided by over-parameterization, namely by providing redundancy of inputs.

An aspect of the invention concerns exploiting this redundancy to beneficial ends. One beneficial application of the invention is to better realize the concept of an endless polarization controller. An over-parameterized system can improve known controls in dealing with the endless control range problem, because if one independent control variable approaches the limit of its range, it is possible to achieve deflection of the output alternatively by using a different control variable. Over-parameterization alone cannot necessarily ensure endless polarization control. For example, shifting from deflecting a control input that is at its limit, to deflecting a different control input, could conceivably result simply in all the control inputs eventually coming to the limits of their ranges. However, over-parameterization reduces the likelihood of endless control range problems. Moreover, it has been found that a sufficient degree of over-parameterization together with an inventive polarization control as described herein can substantially eliminate endless control range problems.

An intelligent parameter-search algorithm is preferably employed, and is provided with a process or technique for choosing a set of parameters that is optimized according to one or more programmed objects in addition to merely seeking to maintain a target control value for the controlled output. More particularly, supplemental objectives are applied to determine how the target control value will be achieved from a set of alternatives. The supplemental objectives are applied in addition to conventional control objectives such as quickly reaching a controlled value, avoiding oscillations and the like.

There are a number of potential control algorithms that can be used to optimize the manner of seeking a target output level by judicious choices of control input levels, provided that over-parameterization provides the ability to choose among alternatives. A preferred optimization algorithm for effecting the supplemental objective or objectives calculates a set of system parameters that maximizes or minimizes a particular function or functions. In the preferred embodiment of a polarization controller, the algorithm is arranged to minimize certain measures that can be termed error functions. There may also be one or more other constraints or objectives imposed on the system parameters, which can be used as supplemental objectives to govern the choices of changes to over-parameterized control inputs.

In the case of polarization control, the choice of the error function(s) and constraints can be related to the number of controls being used (specifically the extent of redundancy provided), for example to bias the control process in favor of spreading the deflection of the input parameters over a range of alternative inputs. The limits of the operating range of each control can be taken into account, for example biasing the control process to choose operating points that are near a particular point in the range, such as mid-range or at the upper or lower limit as dictated by expectations for adjustments that may become necessary. The present operating point of each control can also be taken into account in a manner that biases the choice in favor of the smallest stepwise change in individual input values, compared to their present operating points, to achieve the required output level. These choices and other similar choices can allow the control process not only to seek the desired output, but also to optimize the robustness and the performance of the controlled device.

Moving a set of control inputs or parameters from one value to another in order to change the output from one polarization state to another, may involve a trajectory of changing polarization states as the output is moved from one point to another (e.g., from point to point on a Poincaré Sphere). A further objective can be to make the change from the starting point to the ending point using the smallest possible swing in the output to reach the ending point. Including in the case of an endless polarization control, the variation of the output SOP should remain as small as practicable during the process of changing the control parameters (retardations) to the optimal new set. More specifically, not only should the controller seek an output SOP that is as close as possible to the control target SOP (the required output for transformation to a new arbitrary polarization state), but the transient output SOP should also be maintained close to the target SOP. Eliminating or at least minimizing swings in the output improves responsiveness and otherwise facilitates a practically endless control.

In order to ensure that the transient output SOP remains substantially close to the target SOP, a specific trajectory can be selected to govern the parameter variation from the starting state to the ending state. This controlled progression or controlled process is akin to a controlled process of unwinding to reduce the deflection of a control input that is near the limit of its control range. However, according to the invention, the controlled process or progression is coordinated among the inputs by the controller, and is not merely recovering the expended control range of one of the input parameters at the potential expense of the others.

One of the concurrent supplemental objectives, that is an alternative or addition to the objective of unwinding to a tenable point in a control range, is to use the redundant degrees of freedom to obtain the new output value while keeping the new parameter input values as close as possible to the previous set of input values. In other words, the control has the objective of making the smallest input parameter variation that is possible to achieve the required output. Normally, this also results in a trajectory or transient change in SOP that proceeds substantially directly over the surface of the Poincaré Sphere from the initial output SOP to the target output SOP.

Minimizing the fluctuation of the transient SOP and minimizing the variation between the starting and ending parameter sets are separate objectives that are practiced concurrently, together with optionally favoring control input parameter values that are at a predetermined area of the available range (e.g., the midpoint of the range). The difference between the starting and ending parameter sets affects the smoothness of the parameter transition, not the direction of the parameter change. In choosing a trajectory, the control process can use other criterion to ensure that the new parameter set does not bring any of the input parameters to a point near an applicable tuning limit. In other words, the values of the parameters are biased to favor "mid-range" values and to avoid the limits.

Of course it is also possible to bias the control to seek another point in the input parameters' control ranges, such as to keep all the parameters near their low points or high points in the case of a controlled apparatus in which the situation often requires the output level to creep up or down, respectively. The technique may also be used, for example, to seek an operating range in which a controlled element is known to operate most linearly, etc.

It should be apparent that the invention can be applied in the case of a control system that has just one extra or redundant input. In the case of a polarization controller, three degrees of freedom may be provided by use of three independently controlled differential retardation cells. Preferably, there are more degrees of freedom than one single degree of freedom, with the result being even more effective control to meet the aforesaid supplemental objectives.

Figure 4:
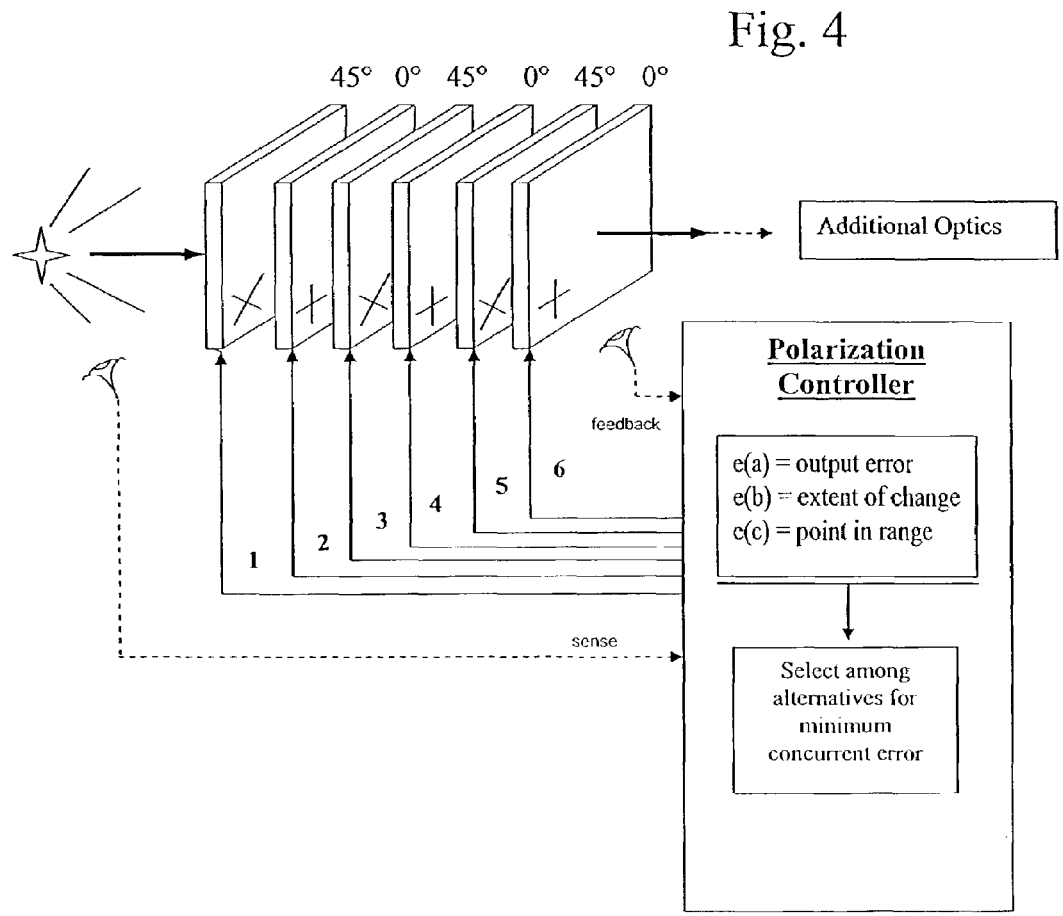
FIG. 4 is a schematic illustration of a six-cell polarization controller according to one embodiment of the invention.

A preferred embodiment of the polarization controller according to the invention comprises six differential retardation cells, as shown in FIG. 4. A six-cell configuration as shown has been found to operate very effectively without requiring or necessarily using any controlled process to govern the trajectory of changes from one polarization state to another. This benefit is provided because ample degrees of freedom are provided to enable a variety of choices for input parameter levels to meet most desired output values. Thus, using an intelligent parameter search process, the six-cell system shown can substantially avoid the endless control problem automatically.

Controlled processes such as limited trajectories, unwinding of particular control parameters and the like, require coordinated control of all in the input parameters so as to proceed along the controlled trajectory. Control of several parameters in a coordinated way may not always be necessary or desirable (or even possible) in some applications. If every control input needs to be gradually tuned while coordinating the group of control inputs, the process may be time consuming. Uncontrolled processes can avoid these problems, and have been found to be possible according to the invention, in a six-cell polarization control configuration, as an example, without adverse effects.

The output SOP can be calculated from the input SOP using the Jones Matrix method. The system input parameters are the retardances of the six cells in the device, which can be independent control variables having finite ranges. Thus the Jones Matrix calculations can involve six-dimensional parameter space. The selection of input levels can be made to meet or optimize for various objectives. Without loss of generality, a process or algorithm based on the Levenberg-Marquardt method is discussed herein as an example.

As discussed above, endless polarization control advantageously is accomplished under one or more constraints in addition to simply controlling the polarization state of the output. An exemplary constraint is to keep the transient swing of the output SOP to the minimum necessary. In a controlled process involving progression through trajectory of output values from the starting to the ending SOP output value, this is achieved by controlling the incremental changes in the input parameters. This close control may not be necessary in applications where there sufficient degrees of freedom are available to otherwise control the output SOP while varying the input parameter control values.

It is possible to use an approach involving controlling the difference between the next input parameter set and the previous set. That is, to minimize the swing of the inputs (instead of or in addition to controlling to minimize the swing of the output trajectory). Simultaneously, it is desirable to ensure that the new parameter set values do not exceed the tuning boundaries (or otherwise vary from control objectives, for example, limiting the difference between the parameter set values and a desired point such as the middle of the tuning range). These control objectives can generally be met concurrently in a case where the control is over-parameterized sufficiently to provide a number of alternative input values for obtaining a given output.

In a preferred embodiment of the invention, several concurrent error functions are operated to control or bias the selection of alternative input parameter values used to obtain a predetermined output SOP. This control can involve a numerical search of candidate values over a range such as a randomized selection of candidate values. Alternatively, a pragmatic or deterministic selection can be made on the basis of incremental changes. A combination is also possible, such as a search of randomized candidate values to provide an initial approximation of the desired output value, followed by pragmatic adjustments.

The invention can be applied by employing a set of concurrent error functions. A primary error function is the difference between the output SOP presently achieved by the present input parameter values, and the target SOP. This is the basic error function of controlling to obtain a desired output value. Minimizing this error causes the output polarization state to home in on the desired output state.

A second error function, that preferably is minimized concurrently, is the difference between the current input parameter set values and the previous set. This "error" is an indication of the rate of change of the parameters, which preferably is as small as possible while ensuring a smooth transition.

A third error function that also is minimized concurrently is the difference between the input parameter values and the middle of the respective control tuning range of each. This last function is specially designed for the prevention of the endless problem, and to reduce the likelihood of any of the input parameters approaching the upper or lower limit of its available control range.

Additional error functions may be added as needed to improve the performance and the robustness of the algorithm. For example, in addition to seeking to minimize the primary error function discussed above, attention can be paid to damping against resonance and other known control objectives. Instead of seeking or biasing in favor of a midpoint in a control range, it is possible to seek of bias towards a high or low area of the range or an area that is otherwise desirable, for example due to a particular operational characteristic such as linearity.

Assuming that the three mentioned error functions are concurrently managed in a polarization controller having a succession of differential retardation plates and over-parameterized control inputs, the error functions can be handled substantially according to the following processes.

The primary error "e(a)", related or proportional to the difference between the final SOP and the target SOP, can be handled in a straightforward manner and in preference to the other error functions described herein, which operate concurrently. Minimizing the primary error function causes the SOP transformation to move to the desired and expected target output value or SOP. It may be advantageous in some applications to use a generalized function of the variation, for example, the root-mean-square of the difference. There are alternative known ways numerically to assess the difference between two polarization states. One operable way is to numerically calculate the angular difference between the present and the desired SOP on the surface of a Poincaré Sphere, the angle being used to represent the difference between these two SOP values. Other possibilities include the circumferential distance on a unit Poincaré Sphere, the distance on a Poincaré Sphere that also includes amplitude (i.e., with a radius other than one), or the distance according to particular vector components of a Stokes value, etc.

The primary error function control algorithm can be repetitive attempts to move stepwise by the full expected distance (or Poincaré Sphere angle) to the new SOP. The primary error function can also include damped or second order control techniques for homing on the new SOP, while preventing oscillations.

The second error function "e(b)", related or proportional to the difference between the current parameter set values and the values of the previous set, is minimized to control the smoothness of the transition between two consecutive parameter sets. Minimizing this error function smoothes the transformation between SOPs. A straightforward way to define this error function is by a root-mean-square (RMS) calculation on the positive and negative incremental changes in each of the individual parameter input values. That is, the positive or negative changes of each input parameter are squared and summed. The RMS error function is related to the square root of the average.

The third concurrent error function "e(c)" is related or proportional to the difference between the input parameter set values and the middles of their respective tuning ranges. This error function can prevent the endless problem. As discussed above, the endless problem (and the need to unwind an input to retract from an endpoint) arises when one or more controls reach the limit of their tuning range. Specifically in the polarization control using differential retardation elements, the endless problem arise when one or more of the cells reaches the limit of its controllable span of retardation. Error function e(c) is arranged to bias in favor of a situation in which all the retardations are maintained close to the middle of their tuning ranges, thereby minimizing the risk that the next desired change will move the input parameter to its limit. Choosing a set of inputs near their tuning range midpoints is only possible in an over parameterized system, because there is some freedom to choose among alternative sets of input values to obtain a given desired polarization transformation.

The ability to find a set of control parameters that minimizes the third error function e(c) turns in part on the extent to which the system is over-parameterized. With substantial freedom of choice, there are numerous alternative solutions (different sets of input parameter values that achieve the same desired output SOP). Thus with substantial over-parameterization, there is increased likelihood that some of the SOP solutions will also concurrently minimize the second and third error functions as compared to other alternatives. The system only selects the parameter set that is closest to the midpoint of the retardation tuning range, while concurrently meeting the possibly superior requirement to minimize e(a) and e(b) within preset limits.

There are various ways numerically to calculate the error e(c) or difference between the selected control point and the endpoints of the control range of the respective independent controls, of which there are preferably six (one per retardation cell). Examples are the standard deviation, the maximum deviation, and the sum of absolute deviations, for example.

Another aspect to be considered is that the tuning range of the retardation cells does not necessarily run from 0 to $2\pi$ radians at the wavelength of interest. By the same argument, the middle of the tuning range thus is not necessarily $\pi$. An appropriate range can be chosen, and can be variable, for example as a function of wavelength. For example if the operating range is determined to be $\phi$ to $\phi+3.4\pi$, then the desired middle of the range would be $\phi+1.7\pi$, with $\phi$ being a changeable value, etc.

The error functions e(a), e(b) and e(c) can be simultaneously and/or independently minimized following standard techniques for simultaneous control procedures. For example the primary control e(a) can be of primary interest, or the three controls can be combined using certain, appropriate weighting factors, for example strongly favoring e(a) (or otherwise). A single error function to be minimized can be expressed:

$$E = A_1 e(a) + A_2 e(b) + A_3 e(c).$$

The weight factors $A_1$, $A_2$ and $A_3$ are chosen according to the system requirements.

Another way to process these error functions is to restrict the rate and/or the range of the parameter change from one step or control iteration to the next. For example, to minimize the difference between the parameter sets, it is possible simply to limit the numerical search for candidate values to a set of values that neighbors the previous parameter set, thereby limiting the maximum difference between these two parameter sets to the size of the defined neighborhood. These two approaches can be used separately or together.

The following example, illustrates an optimization procedure that is apt for the polarization control of the invention, and includes an example of the complete constraints of the numerical search used in a simulation to demonstrate the effects. Other particular sets of constraints can also be used, based on the principles described above.

In the example, the primary and third error functions e(a) and e(c) are combined to place more emphasis on the primary error e(a) by use of an arbitrary chosen weighting factor:

$$E = e(a) + 0.2e(c).$$

The error function e(b) also could be incorporated into the final error function. However, for illustration purposes, in this example the error function e(b) was minimized by limiting of the parameter search to fulfill this requirement. To do this, a rule is defined. For example, assume that the deviation of the parameter set from the previous set should be as small as possible, and no parameter should deviate from its previous value by more than a certain number of radians d. One way to control the maximum deviation of parameter is d is to use a change of variable, for example $$\vec{a} = \vec{a}_0 + \frac{2d}{\pi} \cdot \tan^{-1} \vec{b}$$

Where a is the polarization controller parameter set, $a_0$ is the previous parameter set, b is the set of new variables for the control algorithm, and d is the largest allowed deviation. Therefore, although variable set b can vary unbounded, the new parameter set a is always within d of the previous parameter set $a_0$.

A numerical simulation for an endless polarization control was run using the configuration shown in FIG. 4 and the control algorithm described above. The continuous change in the input SOP was modeled by simulated passage of the light wave through a birefringent wave plate. The retardation of the waveplate was increased without limits while the orientation of the waveplate was also gradually changed. Because of the unbounded retardation and the randomly varying orientation, the input SOP was caused to rotate until it encompassed a random selection of points distributed over the whole Poincaré Sphere. This approach simulates an endlessly rotating waveplate, as well as an infinitely tunable waveplate, i.e., a succession of input SOP trajectories as shown in FIG. 5.

This input was then applied to the control algorithm with the objective to convert each sample of this ever-changing input SOP to a fixed output SOP. The simulation results are shown in FIGS. 6(a) and 6(b). The errors between the target SOP and the final SOP, in terms of the angular distance on the Poincaré Sphere with the unit of radians, were small, i.e., less than 0.001. FIG. 6(a) shows that even with this diversity of values, the selected retardations for the different cells could be kept within $2\pi$ over the entire test. As shown in FIG. 6(b), the change in parameter values from one solution to the next was relatively smooth. Using this control, the input parameters can be held or concentrated in the middle part of their tuning ranges, and even in the worst case, none of them ever reached the imposed $2\pi$ retardation limit.

Figure 7A:
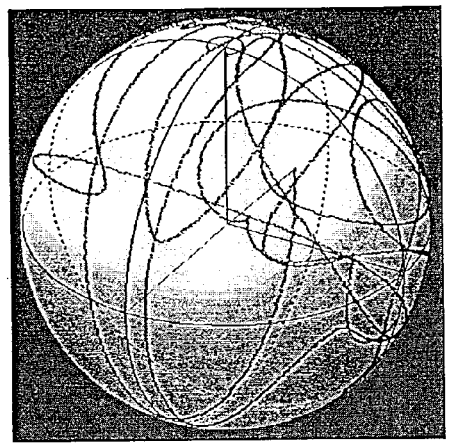
FIGS. 7(*a*) and 7(*b*) are Poincaré Spheres comparing an uncontrolled trajectory versus the error controlled technique of the invention, for progressing from a first polarization state to a second polarization state that is not radically different from the first state.
Figure 7B:
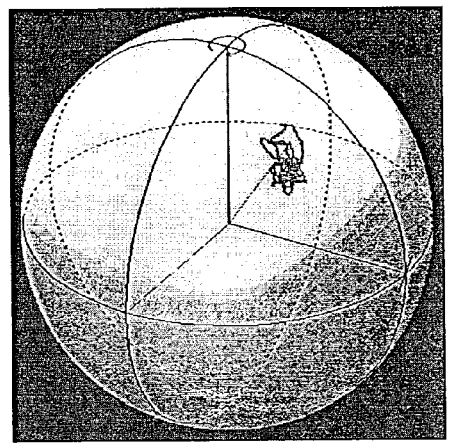

An additional test was also run, as illustrated in FIGS. 7(a) and (b), to test the validity of these principles. With the input SOP varying through the trajectory shown in FIG. 7(a) the control principles kept the output SOP within the much smaller trajectory shown in FIG. 7(b), namely at and around the desired arbitrarily selected target SOP.

Figure 8A:
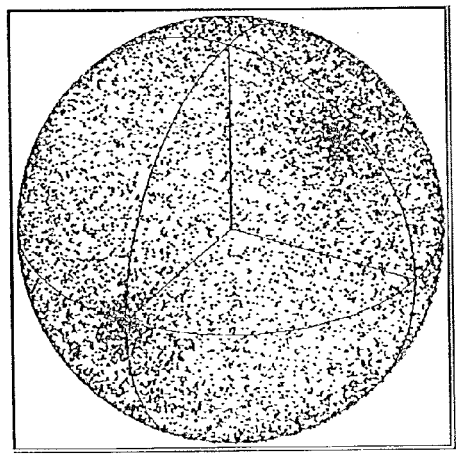
FIGS. 8(*a*) and 8(*b*) illustrate the distribution of polarization states that are achieved in a polarization scrambler having minimal over-parameterization by use of three cells (FIG. 8(*a*)) versus substantial over-parameterization by use of six cells (FIG. 8(*b*)).
Figure 8B:
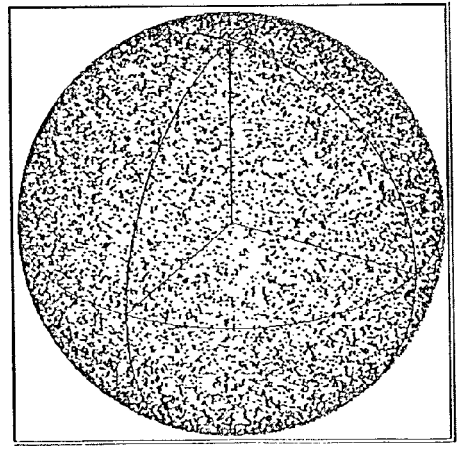

The invention was further applied to a polarization scrambler, in an effort to determine the practical effects of having more or less over-parameterization. FIGS. 8(a) and 8(b) show the results. As discussed above, an over-parameterized polarization control having six cells was highly effective in simultaneously meeting three error control functions or objectives, namely controlling for (1) a target SOP, (2) minimum stepwise changes to the individual inputs and (3) input values that were spaced from the ends of their respective control ranges. However, with less extensive over-parameterization, for example with only three cells or only one parameter over the minimum of required to control polarization state, the effectiveness in meeting these concurrent functions suffered as shown in the polarization scrambling results in FIG. 8(a), using three cells versus FIG. 8(b), using six cells.

Polarization scrambling polarization has various applications, including those that benefit from exercising the full range of possible polarization states. Scrambling the input polarization to a measurement device can minimize measurement uncertainties caused by sensitivity of a testing device to the polarization state of the input light wave. Performance degradation of an optical amplifier due to polarization-dependent-gain (PDG) can be suppressed by scrambling the state of polarization (SOP) of the input. Polarization scrambling can also be helpful in sensing or measuring polarization dependent effects, such as polarization dependent loss and polarization dependent gain.

The ideal polarization scrambler would transform any succession of input SOPs into a uniformly random distribution of output SOPs. This turns on the ability of the scrambler to transform accurately to obtain arbitrary SOPs, and also on the uniformity of the transformation. If the transformation is not uniform, the scrambled output SOP may be characterized by concentrations at certain polarization states. In that case, polarization dependent effects may not be removed.

A polarization scrambler can use as set of cascaded tunable birefringent waveplates, operated to obtain random differential retardation, so as to scramble the output SOP. The results of a polarization transformation depend on the incident SOP. As a result, if the transformation is not wholly random, the scrambling results are not uniformly distributed among all possible SOPs.

For example, if the incident SOP is parallel to the optical axis of the first waveplate, then changing the differential retardation induced at first waveplate will not produce any change in the SOP of the passing light wave. An over-parameterized scrambler, however, improves the randomness of scrambling, particularly if six or more differential retardation waveplates are used in the scrambling.

FIGS. 8(a) and 8(b) compare the Poincaré Sphere coverage for polarization scrambling using three or six cells, respectively. The six-cell device yields more uniform coverage, i.e., a lower degree of polarization. Another advantage of the preferred over-parameterized device, with six or more cells, is that the scrambling speed is faster compared to device with fewer controls and perhaps thicker waveplates. The speed of scrambling can be further increased by including one or more faster elements in the device, such as a fiber squeeze element.

The neighboring waveplates preferably are arranged such that their optical orientations always differ, for example, by 45°. An orientation difference of 45° is efficient in connection with imposing a series of differential retardations, because the respective plates process different orthogonal components of the light wave at each cell. Another example would be that the use of an incremental of 30 degree for the six-cell configuration.

The over-parameterized system of the invention can be used in a cascaded structure, sandwiching a polarization sensitive element, for example, to produce an optical device such as polarization synthesizer. A polarization synthesizer can be used to generate the output SOP deterministically.

In general, the output SOP of a polarization control device depends on the input SOP. Therefore, it is convenient to transform the arbitrary incident SOP into a fixed and predefined SOP endlessly, before converting it into the desired polarization state. That is, two or more polarization control devices can be cascaded, of which at least one is over-parameterized as discussed herein.

Figure 9:
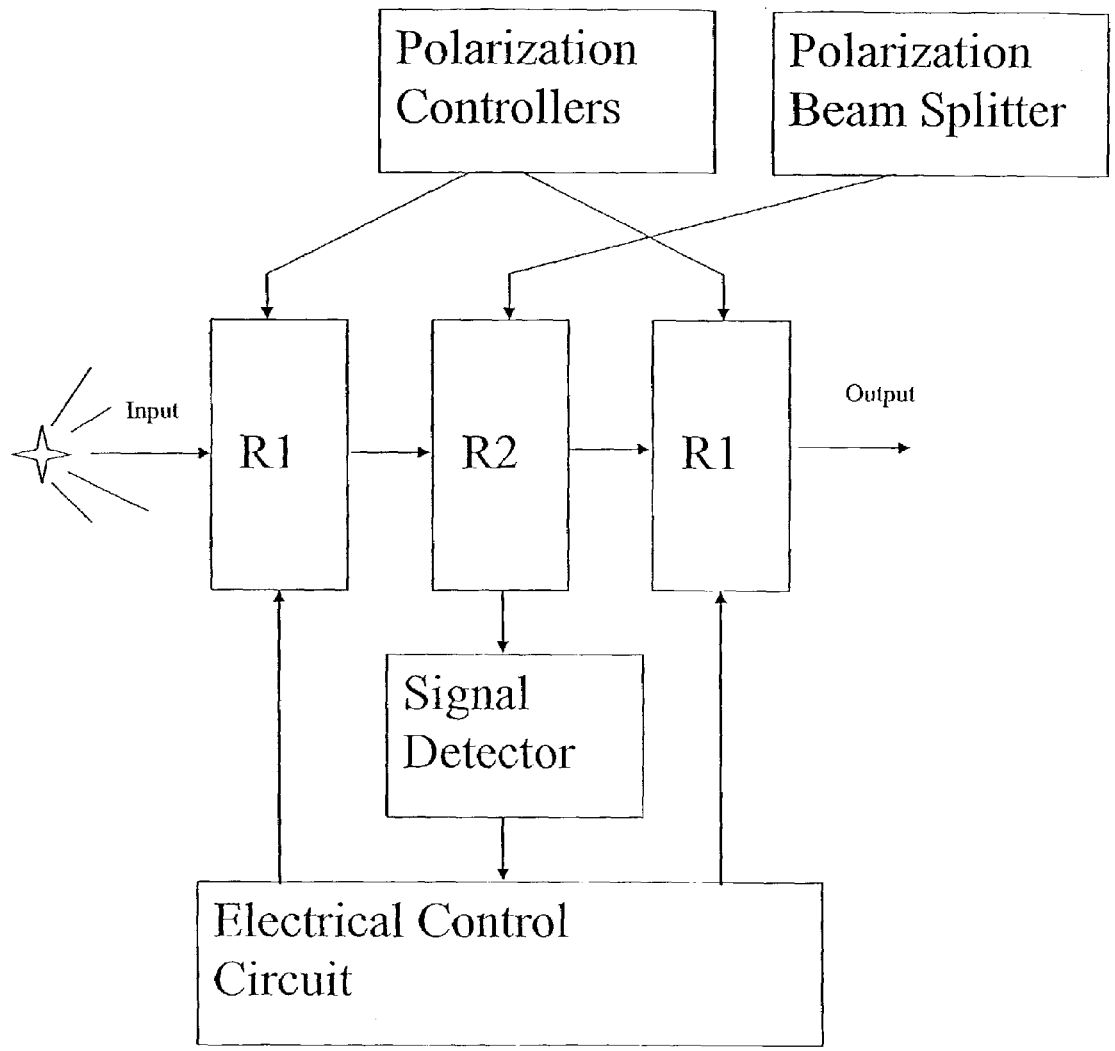
FIG. 9 illustrates the concept of a polarization synthesizer consisting cascaded over-parameterized polarization controllers, sandwiching a polarization sensitive optical element, such as a polarization beam splitter.

The endless transformation can be achieved by a first over-parameterized polarization control element. A polarization sensitive element, such as a polarizer and/or a polarization beam splitter can be used to monitor the SOP and to provide a feedback signal that can be used as the error function, as shown in FIG. 9. The feedback control signal can also be determined by monitoring the output power after the second polarization controller. In general however a more complete polarization measurement system capable of measuring the complete polarization properties may be used, but the preferred embodiment would be to use a polarization sensitive element such as a polarizing beam splitter. The second polarization controller, which may also be over-parameterized, would then be used to transform the fixed incident SOP into an arbitrary output SOP deterministically. The added control parameters can be used to enable the endless transformation, or to compensate for unwanted residual polarization effects caused by polarization sensitive elements, such as the fiber pigtail. In the cascaded structure, there are some applications in which only one of the two systems needs be over-parameterized, and in other applications both can be over-parameterized.

The invention has been described with reference to a number of preferred examples and certain particular applications. The invention is capable of other applications, and reference should be made to the appended claims rather than the foregoing examples, in order to assess the scope of the invention in which exclusive rights are claimed.

We claim:

1. A polarization controller, comprising:
   a succession of optical elements arranged along a path of a light beam between an input and an output;
   wherein the succession of optical elements includes a predetermined number of optical elements in said succession, that are each controllable for determining a polarization state of the output, at least one of the optical elements in the succession comprising a device having a tuning range with maximum and minimum endpoint limits for determining said polarization state, which limits cannot be exceeded;
   wherein the succession of optical elements has a predetermined minimum number of said optical elements such that said succession of optical elements is configured to obtain a unique polarization alteration;
   wherein the succession of optical elements further comprises at least one additional optical element that is controllable for determining the polarization state of the output, wherein interaction of the predetermined number of optical elements with the additional element is such that a given polarization state of the output can be achieved by choosing one of a plurality of alternative sets of values of control settings applied to the predetermined number of optical elements and the additional optical element;
   a controller operable to select among said alternative sets of values, wherein the controller is operable to select among the alternative sets so as to minimize at least one error function; and,
   wherein the at least one error function favors values of the control settings at a predetermined area within a range of possible values of the control settings.

2. The polarization controller of claim 1, wherein the at least one error function favors values of the control settings that are spaced from said endpoint limits of the tuning range.

3. The polarization controller of claim 1, wherein the device having the tuning range with maximum and minimum endpoint limits comprises an electro-optic liquid crystal.

4. The polarization controller of claim 1, wherein the optical elements comprise a series of birefringent elements that are successively oriented such that their principal axes are oriented at 45° relative to one another, and impart differential retardation to polarization components of the beam of light.

5. The polarization controller of claim 1, wherein the output is controlled to obtain a randomized polarization state.

6. The polarization controller of claim 1, further comprising at least one additional polarization control device, and at least one additional optical element, in cascade with said succession of optical elements, whereby the polarization controller and the polarization control device provide independent polarization controls.

7. The polarization controller of claim 6, wherein the at least one additional optical element is sensitive to a resulting transformed polarization state due to the polarization controller and is capable of providing feedback control for the said polarization controller.

8. The polarization controller of claim 1, further comprising a detector operable to determine a transformed polarization state produced at least in part by the polarization controller and further comprising a feedback control coupled between the detector and the polarization controller for the said polarization controller.

9. An improved light processing apparatus, comprising a plurality of electrically controllable optical elements arranged successively along a path of a light beam between an input and an output, wherein each of said optical elements is controllable via an control signal having a value within a range, to impart a corresponding differential retardation to polarization components of the beam, thereby altering a polarization state of the light beam; and a controller coupled to control said optical elements, to obtain a unique polarization alteration; wherein the improvement comprises;
   at least one further controllable optical element along the path of the light beam, in addition to said optical elements, the further controllable optical element being coupled to the controller in addition to said optical elements for the polarization alteration, said further controllable optical element selectively effecting a further polarization alteration;
   wherein the controller is operable to choose among alternatives sets of control signal values applied to said optical elements and to the further controllable optical element, for selectively achieving a polarization state at the output using different said control signal values to achieve the same said polarization state at the output;

wherein at least one of said plurality of electrically controllable optical elements and said further controllable optical element comprises a device having a tuning range with maximum and minimum endpoint limits for determining said notarization state, which limits cannot be exceeded; and, wherein the controller is operable to select among the alternative sets so as to minimize at least one error function that favors values of the control signal values at a predetermined area within a range of possible values of the control signal values.

10. The apparatus of claim 9, wherein the given polarization state at the output is one of a predetermined polarization state, a predetermined transformation, a time varying transformation and a randomized polarization state.

11. The apparatus of claim 9, wherein the controller is operable to choose among said alternatives so as to favor values of the control settings that are spaced from endpoints of a range of possible values of the control settings.

12. The apparatus of claim 11, wherein the controller is operable to choose among said alternatives so as to minimize at least two error functions chosen from said set.

13. The apparatus of claim 9, wherein the optical elements comprise a series of at least four birefringent elements that are successively oriented such that their principal axes are oriented at 45° relative to one another, and impart differential retardation to polarization components of the light beam.

14. The apparatus of claim 9, wherein the optical elements comprise a series of at least six elements that impart differential retardation to polarization components of the light beam.

15. The apparatus of claim 14, wherein the controller is operable to select the sets to maintain each value at a point spaced from a limit of a respective said range applicable to a corresponding one of the controllable elements.

16. The apparatus of claim 9, wherein the controller is operable concurrently to control selection among the alternative sets of values in a control process operable to minimize errors related to at least one of:
  a signal proportional to a difference between a polarization of the output and a target polarization;
  a signal proportional to a difference between a current parameter value and predetermined point in a corresponding potential range of the parameter value; and,
  a signal proportional to a difference between a next parameter value and a previous parameter value.

17. The apparatus of claim 9, further comprising a detector operable to determine a transformed polarization state produced at least in part by the polarization controller and further comprising a feedback control coupled between the detector and the polarization controller for the said polarization controller.

18. A method for controlling a state of an output signal derived from an input signal, comprising the steps of:
  providing a succession of cascaded control stages that concurrently affect the output signal, wherein the state of the output signal is a function of control values applied by each of the control stages in said succession of said control stages and a predetermined number of said control stages are necessarily controllable to achieve a desired polarization alteration of the output signal;
  providing in said succession, in addition to the predetermined number of said control stages that are necessarily controllable to achieve said desired polarization alteration, at least one additional control stage, such that a greater number of said control stages is provided in cascade than the predetermined number that are necessarily controllable to achieve the desired polarization alteration wherein said greater number than the predetermined number of said control stages results in a choice of alternative sets of control values that achieve the same said desired polarization alteration at the output;
  wherein the control stages provided in cascade comprise at least one device having a controllable range with maximum and minimum endpoint limits;
  repetitively applying a present set of control values to the control stages to set the desired polarization alteration of the output, and selecting among the alternative sets of control values to set a next set of the control values, wherein the selecting among the alternative sets includes choosing selections that minimize an error between the state of the output versus a desired state, and also minimize at least one of an error defined by a difference in control values between the present set and the next, and an error defined by a position of the control values versus one or more endpoints of a range of possible values.

19. The method of claim 18, wherein the state of the output is a polarization state of a light beam comprising the output signal, as derived from the input signal passing serially through the cascade of control stages, and the control stages comprise differential retardation stages that contribute to retardation of polarization components of the input signal.

20. The method of claim 18, wherein the predetermined number of control stages is two for effecting a transform between fixed and arbitrary polarization states and the greater number of said control stages is at least four.

21. The method of claim 18, wherein the predetermined number of control stages is two for effecting a transform between fixed and arbitrary polarization states and the greater number of said control stages is at least six.

22. The polarization controller of claim 1, wherein the unique polarization alteration is chosen from the set consisting of:
  a polarization state transformation between a given polarization state and an arbitrary polarization state, wherein said predetermined number is two,
  a polarization state transformation between two arbitrary polarization states, wherein said predetermined number is three
  an endless polarization state transformation between two arbitrary polar states, wherein said predetermined number is four.

23. The improved light processing apparatus of claim 9, wherein the unique polarization alteration is chosen from the set consisting of:
  a polarization state transformation between a given polarization state and an arbitrary polarization state, wherein said predetermined number is two,
  a polarization state transformation between two arbitrary polarization states, wherein said predetermined number is three
  an endless polarization state transformation between two arbitrary polar states, wherein said predetermined number is four.

24. The method of claim 18, wherein the desired polarization alteration is chosen from the set consisting of:

a polarization state transformation between a given polarization state and an arbitrary polarization state, wherein said predetermined number is two, a polarization state transformation between two arbitrary polarization states, wherein said predetermined number is three an endless polarization state transformation between two arbitrary polar states, wherein said predetermined number is four.

* * * * *